(12) United States Patent
Benisty et al.

(10) Patent No.: US 12,045,501 B2
(45) Date of Patent: Jul. 23, 2024

(54) SIDEBAND INFORMATION OVER HOST INTERFACE CONSIDERING LINK STATES

(71) Applicant: Western Digital Technologies, Inc., San Jose, CA (US)

(72) Inventors: Shay Benisty, Beer Sheva (IL); Amir Segev, Meiter (IL)

(73) Assignee: Sandisk Technologies, Inc., Austin, TX (US)

( * ) Notice: Subject to any disclaimer, the term of this patent is extended or adjusted under 35 U.S.C. 154(b) by 119 days.

(21) Appl. No.: 17/479,790

(22) Filed: Sep. 20, 2021

(65) Prior Publication Data

US 2023/0090103 A1 Mar. 23, 2023

(51) Int. Cl.
*G06F 13/16* (2006.01)
*G06F 3/06* (2006.01)

(52) U.S. Cl.
CPC .......... *G06F 3/0656* (2013.01); *G06F 3/0604* (2013.01); *G06F 3/0625* (2013.01); *G06F 3/0635* (2013.01); *G06F 3/0659* (2013.01); *G06F 3/067* (2013.01); *G06F 13/1673* (2013.01)

(58) Field of Classification Search
None
See application file for complete search history.

(56) References Cited

U.S. PATENT DOCUMENTS

| | | | |
|---|---|---|---|
| 8,255,713 B2 * | 8/2012 | Jeyaseelan | G06F 1/325 713/320 |
| 8,549,205 B1 | 10/2013 | Harriman et al. | |
| 8,898,359 B2 | 11/2014 | Freking et al. | |
| 9,568,547 B2 | 2/2017 | Menon et al. | |
| 9,910,470 B2 * | 3/2018 | Garg | G06F 1/3243 |
| 11,755,459 B2 | 9/2023 | Segev et al. | |
| 2010/0205321 A1 * | 8/2010 | Martinez Bauza | H04L 43/0811 709/237 |
| 2014/0195833 A1 * | 7/2014 | Wang | G06F 1/3253 713/320 |
| 2014/0281625 A1 * | 9/2014 | Younger | G06F 1/3206 713/323 |
| 2017/0052579 A1 * | 2/2017 | Abraham | G06F 1/266 |
| 2019/0114218 A1 | 4/2019 | Yun et al. | |
| 2020/0278733 A1 | 9/2020 | Li et al. | |
| 2020/0310517 A1 | 10/2020 | Li | |

(Continued)

*Primary Examiner* — Elias Mamo
(74) *Attorney, Agent, or Firm* — PATTERSON + SHERIDAN, LLP (57) ABSTRACT

A data storage device includes a memory device and a controller coupled to the memory device. The controller is configured to create one or more thresholds for sending sideband information to a host device, determine that a link state is in a state other than L0, retain sideband information until the one or more thresholds is reached, and send the sideband information to the host device upon reaching the one or more thresholds for a corresponding link state. The one or more thresholds correspond to a link state between the host device and the data storage device. The thresholds are either based on an amount of sideband information retained, a time of retaining sideband information, or a combination of the amount of sideband information retained and the time of retaining sideband information. The sideband information is retained and sent in a first-in first-out order.

20 Claims, 6 Drawing Sheets

(56) References Cited

U.S. PATENT DOCUMENTS

2022/0197519 A1\* 6/2022 Kuo ................. G06F 3/0634
2022/0308986 A1  9/2022 Segev et al.

\* cited by examiner

SIDEBAND INFORMATION OVER HOST INTERFACE CONSIDERING LINK STATES

BACKGROUND OF THE DISCLOSURE

Field of the Disclosure

Embodiments of the present disclosure generally relate to data storage devices, such as solid state drives (SSDs), and, more specifically, sending sideband information with respect to link states.

Description of the Related Art

SSDs are connected to their host device through a PCIe interface. The PCIe interface is used to satisfy a required protocol by meeting a given performance requirement. Sideband information, which may not be related directly to host device/data storage device communication, is transferred over the same PCIe interface link. Sideband information may include host memory buffer (HMB) data, debug information, and the like.

Because sideband information is sent on the same link as the host interface (i.e., the PCIe interface), power and link inefficiency may occur since the host device utilizes the same PCIe interface for I/O transfers to the data storage device. Furthermore, when the link is in an inactive state due to power saving requirements, sending sideband information of the link may cause additional link state switches. The additional link state switches may result in a significant power increase since the link state switch causes the system to wake up from the inactive state. Because the system is waking up to only send sideband information, power may be not optimally used.

Therefore, there is a need in the art for a sideband transmission method that takes into account the link state of the interface in order to avoid increasing power consumption.

SUMMARY OF THE DISCLOSURE

The present disclosure generally relates to data storage devices, such as solid state drives (SSDs), and, more specifically, sending sideband information with respect to link states. A data storage device includes a memory device and a controller coupled to the memory device. The controller is configured to create one or more thresholds for sending sideband information to a host device, determine that a link state is in a state other than L0, retain sideband information until the one or more thresholds is reached, and send the sideband information to the host device upon reaching the one or more thresholds for a corresponding link state. The one or more thresholds correspond to a link state between the host device and the data storage device. The thresholds are either based on an amount of sideband information retained, a time of retaining sideband information, or a combination of the amount of sideband information retained and the time of retaining sideband information. The sideband information is retained and sent in a first-in first-out order.

In one embodiment, a data storage device includes a memory device and a controller coupled to the memory device. The controller is configured to create one or more thresholds for sending sideband information to a host device, wherein the one or more thresholds correspond to a link state between the host device and the data storage device, determine that link state is in a state other than L0, retain the sideband information until the one or more thresholds is reached, and send the sideband information to the host device upon reaching the one or more thresholds for a corresponding link state.

In another embodiment, a data storage device includes a memory device and a controller coupled to the memory device. The controller is configured to activate a timer when first sideband data is delivered to a buffer, accumulate additional sideband data in the buffer, deliver the accumulated sideband data to a host device upon reaching a timing threshold of a plurality of timing thresholds.

In another embodiment, a data storage device includes memory means and a controller coupled to the memory means. The controller is configured to configure one or more thresholds, wherein each of the one or more thresholds corresponds with a link state of a plurality of link states, accumulate sideband information in a buffer, wake up a link between a host device and the data storage device, and send the accumulated sideband information to the host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, sending sideband information with respect to link states. A data storage device includes a memory device and a controller coupled to the memory device. The controller is configured to create one or more thresholds for sending sideband information to a host device, determine that a link state is in a state other than L0, retain sideband information until the one or more thresholds is reached, and send the sideband information to the host device upon reaching the one or more thresholds for a corresponding link state. The one or more thresholds correspond to a link state between the host device and the data storage device. The thresholds are either based on an amount of sideband information retained, a time of retaining sideband information, or a combination of the amount of sideband information retained and the time of retaining sideband information. The sideband information is retained and sent in a first-in first-out order.

Figure 1:
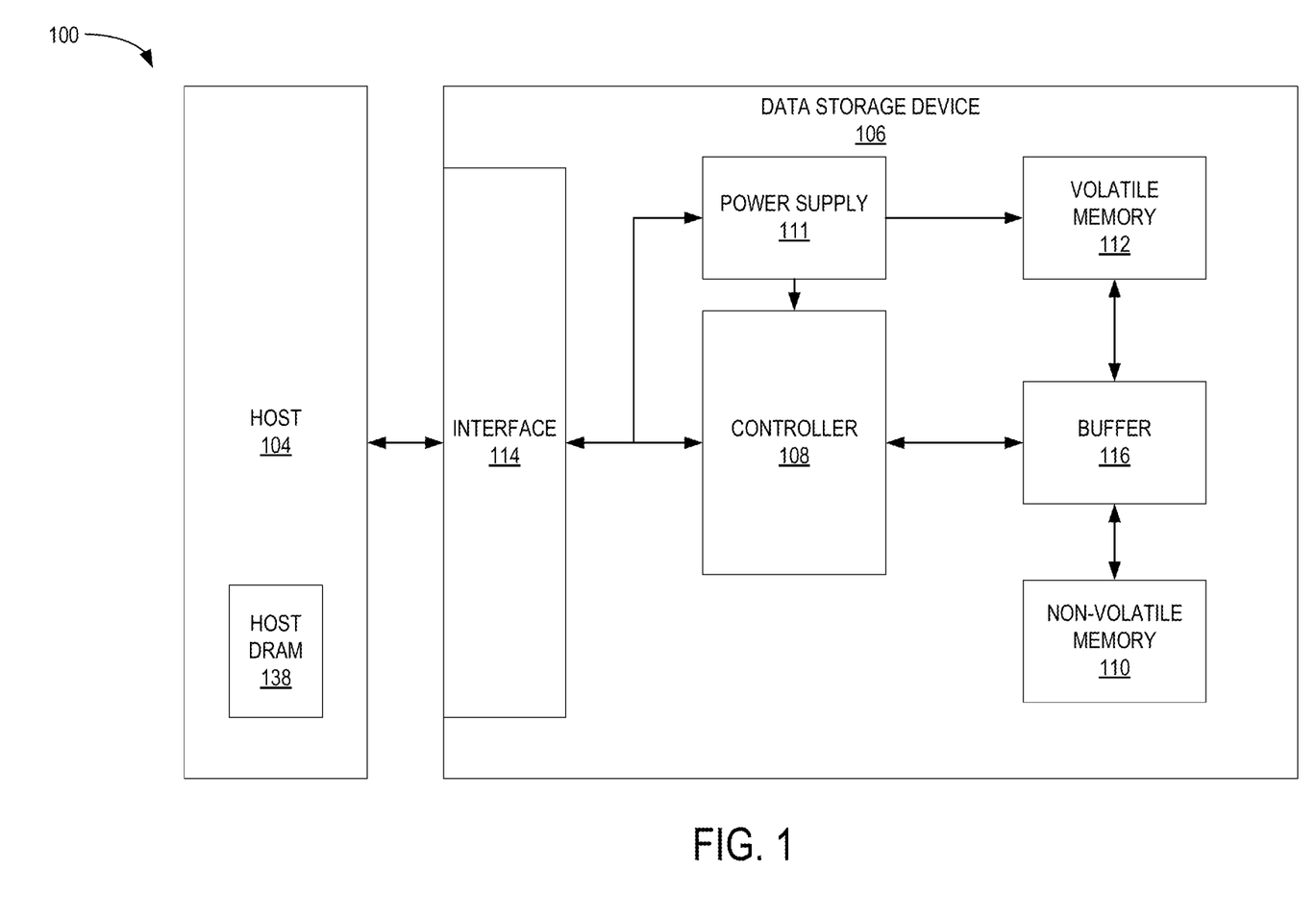
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116.

In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
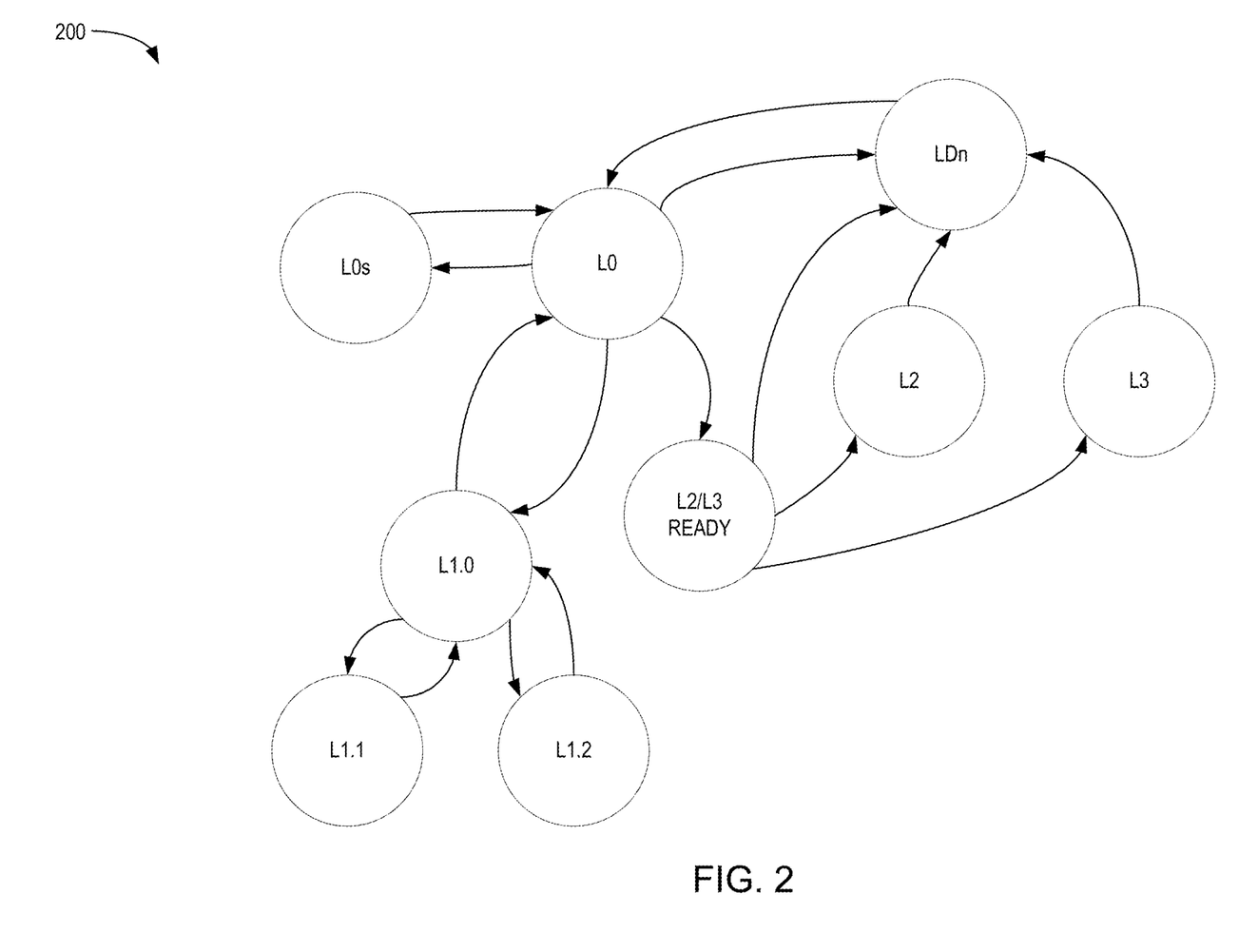
FIG. 2 is an illustration of a link power management flow diagram, according to certain embodiments.

FIG. 2 is an illustration of a link state flow diagram 200, according to certain embodiments. Aspects of the storage system 100 may be referenced in the description herein for exemplary purposes. The data storage device 106 includes several link states. For example, the data storage device 106 may have the following 5 link states: L0, L0s, L1, L2, and L3, where L1 includes a L1.1 sub-state and a L1.2 sub-state.

Each of the link states are associated with a distinct operation of the data storage device 106. Link states L0, L0s, and L1 are considered operational link states and utilize a first range of power, whereas link states L2 and L3 are considered non-operational link states, utilizing a second range of power, where the first range of power is greater than the second range of power.

An operational link state refers to the ability of the host device 104 to communicate with the NVM 110 of the data storage device 106. A non-operational link state refers to the inability of the host device 104 to communicate with the NVM 110 of the data storage device 106 due to a shut down or disconnection of a link between the host device 104 and the controller 108. The listed non-operational link states are not intended to be limiting and may include other link states, such as the L1.1 and L1.2 link states. Furthermore, it is contemplated that more or less link states than the number of link states shown in the link state flow diagram 200 may be available and more or less low power link states may be applicable to the embodiments described herein.

Link states are numbered sequentially, where higher numbers represent lower power requirements due to a greater number of offline circuits and corresponding higher exit latencies. Furthermore, each link state has an associated power requirement and an exit latency. L0 and L0s may require 4.5 W with the lowest exit latency. L1 may require less power than L0, such as 3 W, and may have an exit latency equal to or higher than the exit latency of L0. L2 may require less power than L1 and may have an exit latency equal to or higher than the exit latency of L1. L3 may require less power than L2 and may have an exit latency equal to or higher than the exit latency of L2. The values for the link states and exit latencies are not intended to be limiting, but to provide an example of possible embodiments.

L0 is referred to as a fully operational state, where I/O commands are enabled, and the device may generate interrupts. L0 is a link state where the link is operating normally. Interrupts are an automatic transfer of firmware execution due to a system timer or a user command. Link states L0s and L1 are also operational states; however, L0s and L1 may have a lower functionality than that of L0. For example, L0s has a similar power requirement as that of the L0, but only allows for a serial link in one direction. In the L0s link state, data may be transferred in one direction, but not the other. Thus, when a first device is coupled to a second device through a link, the first device may idle a transmitter of the first device independently and separately of the second device idling a transmitter of the second device, and/or vice-versa.

However, L1 allows for a bidirectional serial link and allows for a greater reduction in the power requirement, but has a higher exit latency than that of L0 and L0s. In the L1 link state, no data is being transferred so key portions of the PCIe transceiver logic may be turned off. Link states L2 and L3 are non-operational link states have a power requirement less than that of the operational link states. The difference between the L2 link state and the L3 link state is that power has not been yet removed from the L2 link state. Furthermore, the memory devices of the NVM 110 that are not used are placed in a non-operational link state, L2 and L3, to limit the idle power consumption to a minimal value.

In order for I/O commands to occur, the link, such as a data bus, between the host device 104 and the controller 108 is woken up and placed into the L0 link state. The controller 108 changes the link state of the link between the host device 104 and the controller 108 from the operational link states, such as L0, L0s, or L1, to a different operational link state, such as L0, L0s, or L1, or to a non-operational link state, such as L2 or L3, depending on the situation. However, in order for the link to be placed into L2 or L3, the link will need to be in link state L2/L3 ready, which is a pseudo-state to prepare the component for a loss in power and reference clock(s). The controller 108 allocates the appropriate amount of power to return all link states L0s, L1, L2, L3 into link state L0 when a full operational state is required. For example, to return to L0 from L2 or L3, the link transitions to a transient pseudo-state, LDn, before transitioning to L0. The LDn state may be a fundamental reset state, a hot reset state, or a link disable transmission state by the upstream component (e.g., the host device 104).

The link state L1, in some embodiments, includes additional sub-states, L1.1 and L1.2, where the link state L1 may be referred to as L1.0. The L1 sub-states (L1SS), L1.1 and L1.2, may require more power for operation than L2 and L3; however, the L1SS utilizes less power than the L1.0 state. At an L1SS, the link remains operational and requires less power to return to a more operational state, such as L1.0 or L0. Furthermore, the L1SS requires less time than the L2 and/or the L3 link states to return to a full active link state L0.

Figure 3:
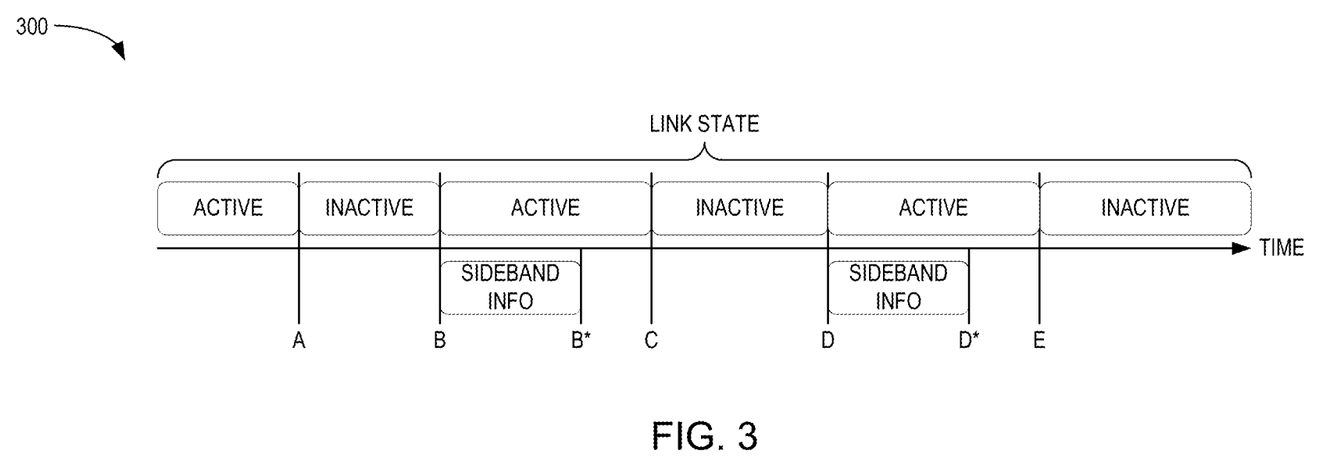
FIG. 3 is an illustration of a link state timing diagram, according to certain embodiments.

FIG. 3 is an illustration of a link state timing diagram 300, according to certain embodiments. Aspects of the storage system 100 may be referenced in the description herein for exemplary purposes. The link state timing diagram 300 illustrates a scenario where the data storage device 106 posts sideband information, such as HMB data or debug messages, to the host device 104 without considering the link state. For example, if the link state is in an inactive state, the data storage device 106 wakes up the link, transmits the required sideband information, and returns to the inactive link state.

As shown in the link state timing diagram 300, the link is transitioned to an inactive state at time A. At time B, the link is transitioned from the inactive state to an active state in order to send sideband information, where the sideband information is sent from time B to time B*. The transition from the inactive state to the active state at time B may be requested by the data storage device 106 in order to send the sideband information. At time C, the link returns to an inactive state. The time between time B*and time C may be a time to transition the link from the active state to the inactive state, where the power consumption is between a power consumption of the link in an inactive state and the link in an active state. A link in the active state consumes more power than a link in the inactive state.

From time C to time D, the link is in the inactive state. At time D, the link is transitioned from the inactive state to an active state in order to send sideband information, where the sideband information is sent from time D to time D*. At time E, the link returns to an inactive state. The time between time D*and time E may be a time to transition the link from the active state to the inactive state, where the power consumption is between a power consumption of the link in an inactive state and the link in an active state. In one example, the transition from an inactive state to an active state at time B and time D is not initiated by the host device 104, but by the data storage device 106. Because the link is woken up (e.g., transitioned from an inactive state to an active state) multiple times, where each time the link enters the active state to just send sideband information, a trailing power consumption (e.g., the time between time B*and C), power consumption of the data storage device 106 may be greater than optimal power consumption.

Figure 4:
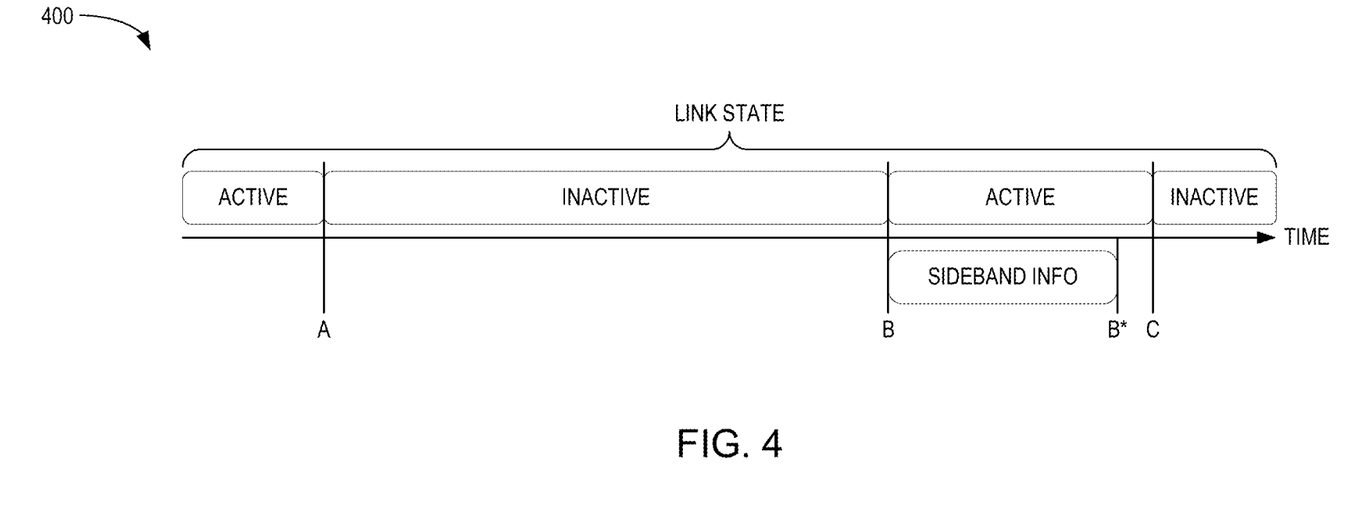
FIG. 4 is an illustration of a link state timing diagram, according to certain embodiments.

FIG. 4 is an illustration of a link state timing diagram 400, according to certain embodiments. Aspects of the storage system 100 may be referenced in the description herein for exemplary purposes. The controller 108, in this embodiment, considers the link status prior to triggering any transmissions of sideband information over the link. The controller 108 includes one or more thresholds for when the sideband information should be emptied or transferred to the host device 104. The one or more thresholds may either be time based, capacity based, or a combination of time based and capacity based. When the link is in the inactive state, sideband information is aggregated or retained in a buffer of the controller 108. The sideband information is stored in a first-in first-out (FIFO) mechanism, such that the sideband information is sent to the host device 104 in the order that the sideband information is received and stored in the buffer.

When sideband information is first stored in the buffer, a timer may be started to track how long the sideband information has been stored in the buffer. In one embodiment, the controller 108 may utilize multiple timers, each timing different sideband information. In another embodiment, the controller 108 may utilize a single timer to track when the buffer first stores sideband information. Furthermore, the controller 108 may determine how much sideband information has been stored in the buffer and whether the amount of sideband information has reached or exceeded a threshold of the one or more thresholds. For example, each threshold of the one or more thresholds may be associated with a link state.

From time A to time B, the link state is in an inactive state, where the controller 108 accumulates sideband information. At time B, a threshold of the one or more thresholds is reached or exceeded causing the controller 108 to wake up the link in order to transfer the sideband information. At time B*, the controller 108 has completed sending the sideband information to the host device 104 and the link returns to an inactive state at time C. Rather than having several small durations for entering and exiting the low power link states, the transactions are merged (i.e., the sideband data is aggregated) so that the data storage device triggers a single wake up (or in cases of an extended period of an inactive state, multiple wake ups) from the inactive state.

When the link is active (either by controller 108 request or host device 104 request), sideband information is posted by the controller 108 as a result of data accumulation or at time elapsed since storing sideband information. In other embodiments, the aggregation of data may be applied to a user data transfer. Thus, power saving may be achieved by avoiding several entry to or exit from low power link states in small durations.

Figure 5:
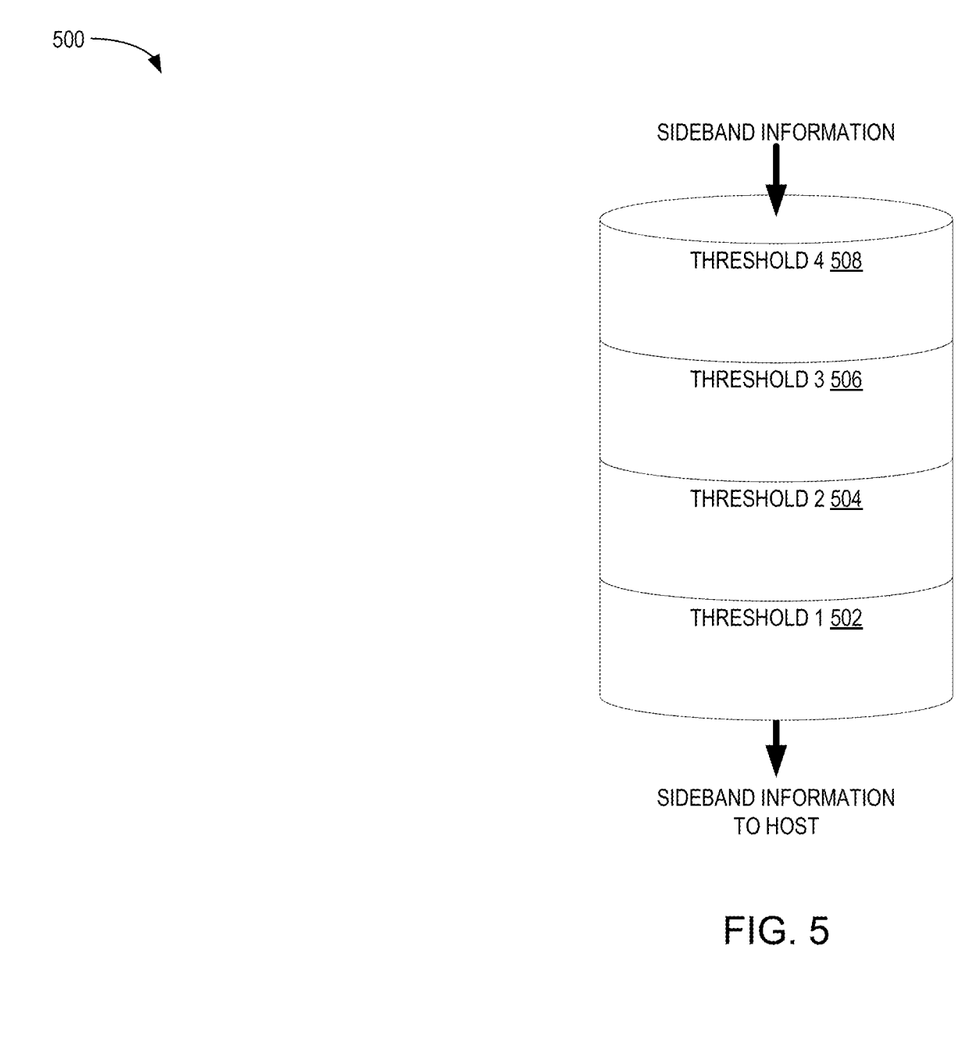
FIG. 5 is a representational illustration of a first-in first-out (FIFO) pipe, according to certain embodiments.

FIG. 5 is a representational illustration of a first-in first-out (FIFO) pipe 500, according to certain embodiments. The FIFO pipe 500 may be a representational embodiment of a FIFO buffer of a controller, such as the controller 108 of FIG. 1, configured to store sideband information. The FIFO pipe 500 has a first threshold 502, a second threshold 504, a third threshold 506, and a fourth threshold 508. The number of thresholds is not intended to be limiting, but to provide an example of a possible embodiment. More than or less than the number of thresholds shown is contemplated.

The plurality of thresholds 502, 504, 506, 508 may be dynamically adjusted during the lifetime of a data storage device, such as the data storage device 106 of FIG. 1. The dynamic adjustment of one or more of the plurality of thresholds 502, 504, 506, 508 may be based on a time that the data storage device 106 has been in use (including inactive time), an input/output parameter based on commands and data received from a host device, such as the host device 104 of FIG. 1, or transferred to the host device 104, a health of one or more blocks of an NVM, such as the NVM 110 of FIG. 1, and the like. The health of the one or more blocks of the NVM 110 may be based on a program/erase cycle (PEC) count of one or more blocks, a bit error rate (BER) of one or more blocks, a failed bit count (FBC) of one or more blocks, a temperature variation of one or more blocks, and the like.

Each threshold of the plurality of thresholds corresponds with one or more link states. Table 1 below illustrates one example of a threshold to link state association.

TABLE 1

| THRESHOLD | LINK STATE | THRESHOLD VALUE |
|---|---|---|
| THR1 502 | L0 | MPS |
| THR2 504 | L0s | MPS*L |
| THR3 506 | L1 | MPS*M |
| THR4 508 | L1SS and L2 | MPS*N |

MPS refers to a maximum payload size, where the MPS is in a size equal to an optimal data transfer size. The optimal data transfer size allows for maximum efficiency per transfer. Thus, each threshold value is in a size equal to a multiple of the MPS (i.e., in the MPS granularity).

Table 2 below illustrates another example of a threshold to link state association.

TABLE 2

| THRESHOLD | LINK STATE | THRESHOLD VALUE |
|---|---|---|
| THR1 502 | L0 | t |
| THR2 504 | L0s | t*Q |
| THR3 506 | L1 | t*R |
| THR4 508 | L1SS and L2 | t*S | t refers to a threshold of that sideband information has been stored in the FIFO pipe 500. For example, when first sideband information is stored in the FIFO pipe 500, the controller 108 initiates a timer that tracks the time that the first sideband information has been stored in the FIFO pipe 500. When the time exceeds a corresponding threshold for the link state, the controller 108 wakes up the link and posts the sideband information to the host device 104. Thus, ensuring that sideband information is not held for an extended period of time internally. In some examples, each link state has the same timing threshold. In other examples, a time duration each timing threshold subsequent time threshold is equal.

Furthermore, when a first link state consumes less power than a second link state, the first link state has a larger threshold value associated with the link state. The larger threshold value may be attributed to retaining more sideband information in order to avoid having to provide more power to wake up the link than a link state with a smaller threshold value. For example, the amount of power to wake up a link from a link state of L1 to a link state of L0 may be greater than the amount of power to wake up a link from a link state of L0s to a link state of L0. It is to be understood that the phrase "wake up" may refer to adjusting a link state from a lower powered link state to a higher powered link state. Therefore, referring back to Table 1, L is less than M and M is less than N, where L may be an integer value greater than 1. Likewise, referring back to Table 2, Q is less than R and R is less than S, where Q may be a value greater than 1.

It is to be understood that the one or more thresholds may be based on both a size of sideband information retained and a time of retaining sideband information.

Furthermore, sideband information is stored in the FIFO pipe 500 in order of receiving the sideband information. For example, if sideband information is received in the order of A, B, D, C, E, then the sideband information is stored in the FIFO pipe 500 in the order of A, B, D, C, E and sent to the host device 104 in the order of A, B, D, C, E.

Figure 6:
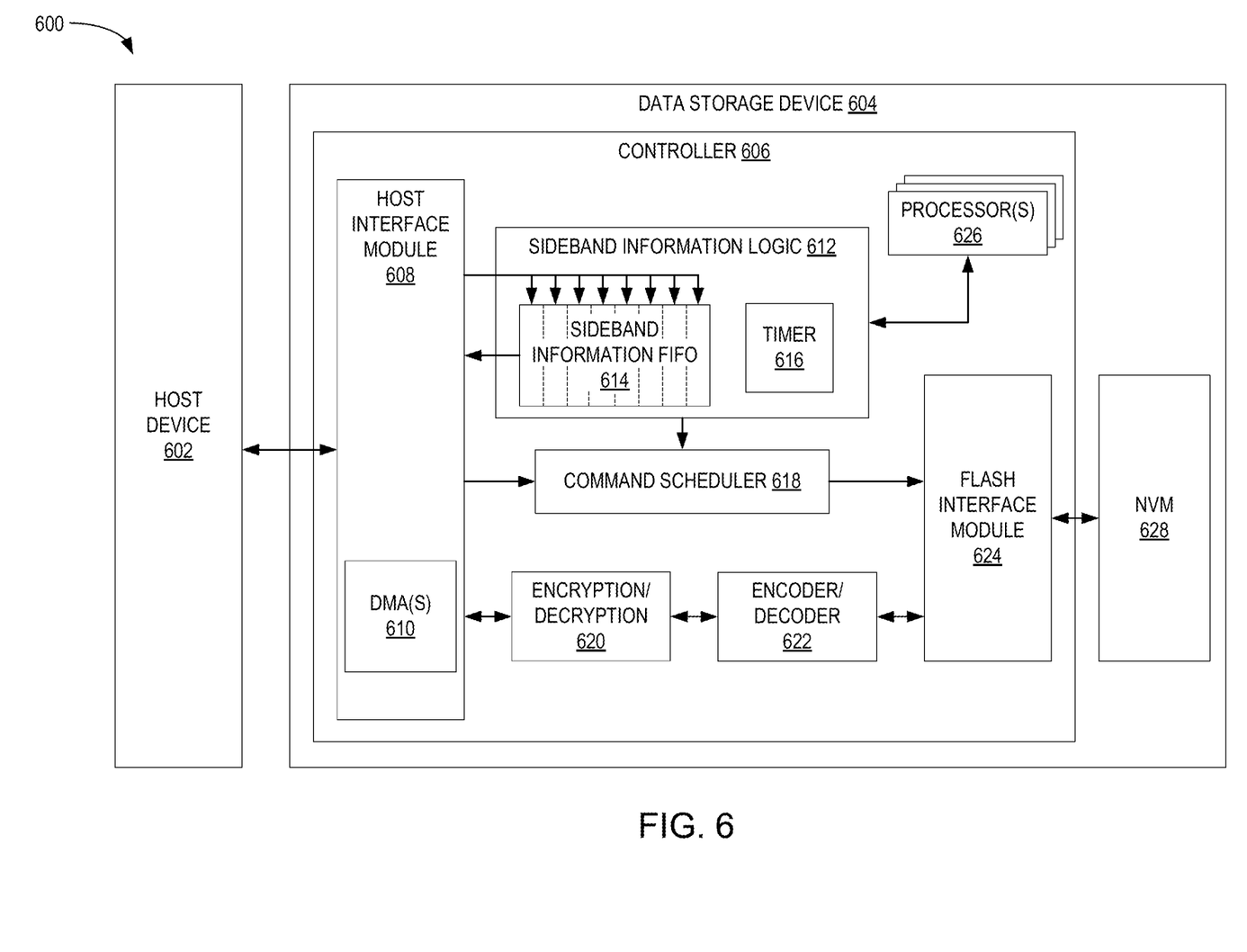
FIG. 6 is a schematic block diagram illustrating a storage system in which sideband information is sent from a controller to a host device, according to certain embodiments.

FIG. 6 is a schematic block diagram illustrating a storage system 600 in which sideband information is sent from a controller 606 of a data storage device 604 to a host device 602, according to certain embodiments. The data storage device 604 includes the controller 606, which may be the controller 108 of FIG. 1, and an NVM 628, which may be the NVM 110 of FIG. 1. It is to be understood that the data storage device 604 may include additional components not shown for simplification purposes.

The controller 606 includes a host interface module (HIM) 608, a sideband information logic unit 612, one or more processors 626, a command scheduler, an encryption/decryption unit 620, an encoder/decoder unit 622, and a flash interface module (FIM) 624. The HIM 608 includes one or more direct memory accesses (DMAs) 610. The HIM 608 is configured to receive commands and data from the host device 602, such as by fetching the commands and data from a submission queue of a host DRAM, such as the host DRAM 138 of FIG. 1. Likewise, the HIM 608 is configured to send data associated with the received commands back to the host device 602 and post completion messages for the completed commands to a completion queue of the host DRAM 138. The one or more DMAs 610 may allow for access to RAM, such as DRAM or SRAM, or the NVM 628 without input from the one or more processors 626. The one or more processors 626 provide instructions and processing (e.g., computational) power in order to execute commands and logic.

The sideband information logic unit 612 includes a sideband information FIFO buffer 614, which may be the FIFO pipe 500 of FIG. 5, and a timer 616. The command scheduler 618 schedules commands (e.g., read commands or write commands) to be executed by the FIM 624 on the NVM 628. The encryption/decryption unit 620 may be separate units, such that the encryption unit and the decryption unit are a separate components in the controller 606. The encryption unit of the encryption/decryption unit 620 may be configured to encrypt the data in order to provide for improved data security and reliability. Likewise, the decryption unit of the encryption/decryption unit 620 may decrypt the encrypted data, such that the data may be sent to and read by the host device 602.

The encoder/decoder unit 622 may be separate units, such that the encoder unit and the decoder unit are separate components of the controller 606. The encoder unit of the encoder/decoder unit 622 may be configured to encode the data, where encoding the data may include generating error correction code, parity data, low-density parity-check data for the data. Likewise, the decoder unit of the encoder/decoder unit 622 may be configured to decode the encoded data in order to determine and correct a number of bit flips or bit errors in the decoded data.

When the link between the host device 602 and the controller 606 enters a low power link state (i.e., a link state other than L0, in the current example), sideband information that would normally be sent or posted to the host device 602 in a size equal to the MPS is sent to the sideband information logic unit 612. The sideband information is stored or accumulated in the sideband information FIFO buffer 614, where the timer 616 starts a timer for when the sideband information is first stored or accumulated in the sideband information FIFO buffer 614. The sideband information logic unit 612, in conjunction with the one or more processors 626, determines the link state of the link between the host device 602 and the controller 606. Based on the link state, the sideband information logic unit 612 determines whether the time of the timer 616 or the size of sideband information retained equals or exceeds a corresponding threshold for the link state. The thresholds may be the thresholds exemplified in Table 1 and Table 2 above. When the threshold for a corresponding link state is reached or exceeded, the controller 606 wakes up the link between the controller 606 and the host device 602 and flushes the retained sideband information to the host device. In one embodiment, the sideband information flushed may be in a size equal to a multiple of the MPS. In another embodiment, the sideband information flushed is not in a size equal to a multiple of the MPS.

Figure 7:
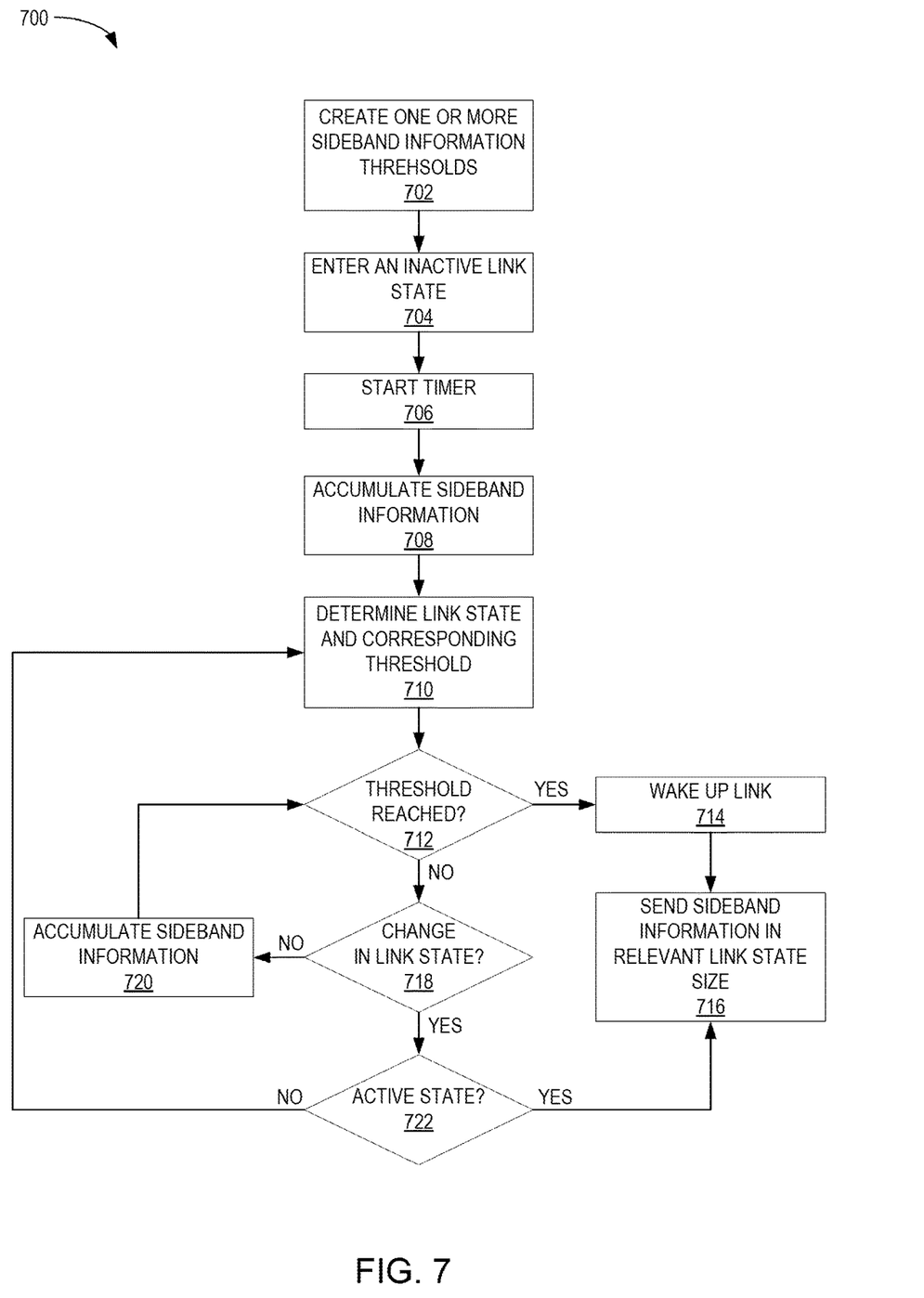
FIG. 7 is a flow diagram illustrating a method of sending sideband information with respect to link state, according to certain embodiments.

FIG. 7 is a flow diagram illustrating a method 700 of sending sideband information with respect to link state, according to certain embodiments. Aspects of the storage system 600 may be referenced for exemplary purposes. At block 702, the controller 606 creates one or more sideband information thresholds for the sideband information FIFO buffer 614. Each threshold of the one or more sideband information thresholds corresponds to one or more link states, where each threshold may be based on a sideband information aggregation size, a time since storing sideband information, or a factor based on a combination of the sideband information aggregation size and a time since storing sideband information. The one or more sideband information thresholds may be dynamically adjusted during the lifespan of the data storage device 604.

At block 704, a link between controller 606 and the host device 602 enters an inactive link state. It is to be understood that an inactive link state may refer to a link state that is not in an L0 link state. At block 706, a timer is started by the timer 616. In one example, the timer may keep track of how long the link has been in an inactive link state. In another example, the timer may be started when sideband information is first accumulated or retained in the sideband information FIFO buffer 614. The timer 616 may keep track of multiple timers. At block 708, sideband information is accumulated or retained in the sideband information FIFO buffer 614. For example, one timer may be started when sideband information is first stored in the sideband information FIFO buffer 614. Another timer may be started at each MPS interval. A timer may be started each time sideband information is stored in the sideband information FIFO buffer 614. At block 710, the controller 606 determines the link state and a corresponding threshold of the one or more sideband information thresholds for the determined link state.

At block 712, the controller 606 determines if the determined threshold for the link state of the link has been reached or exceeded. If the determined threshold has been reached or exceeded at block 712, then the controller 606 wakes up the link at block 714. At block 716, the controller sends the accumulated sideband information from the sideband information FIFO buffer 614 to the host device 602. For example, the sideband information may be sent in a size equal to a multiple of the MPS or in a size equal to the total stored sideband information, where a timer may be updated to keep track of any sideband information remaining in the sideband information FIFO buffer 614.

However, if the threshold is not reached at 712, then the controller 606 determines if there has been a change in the link state at block 718. For example, the link state may be changed from a L1.0 link state to a L1.2 link state or from a L1.0 link state to an L0 link state. If the link state has not changed at block 718, the controller 606 continues to accumulate sideband information at block 720. However, if the link state has changed at block 718, then the controller 606 determines if the link state is in an active state, such as in an L0 link state, at block 722. If the link state is still in an inactive state at block 722, then the controller re-determines the link state and the corresponding threshold for the re-determined link state at block 710. However, if the link state has changed to an active state at block 722, then the sideband information may be sent to the host device 602 in a size equal to a multiple of the MPS or in a size not equal to a multiple of the MPS.

By aggregating and storing sideband information in a sideband information FIFO buffer while a link between a host device and a controller is not in an L0 link state, extra switches between active and inactive link states may be avoided and power may be saved.

In one embodiment, a data storage device includes a memory device and a controller coupled to the memory device. The controller is configured to create one or more thresholds for sending sideband information to a host device, wherein the one or more thresholds correspond to a link state between the host device and the data storage device, determine that link state is in a state other than L0, retain the sideband information until the one or more thresholds is reached, and send the sideband information to the host device upon reaching the one or more thresholds for a corresponding link state.

An L0s state is associated with a first threshold. The first threshold is greater than a maximum payload size (MPS). An L1 state is associated with a second threshold. The second threshold is greater than the first threshold. An L2 state is associated with a third threshold. The third threshold is greater than the second threshold. One or more L1 substates are associated with the third threshold. The sideband information is retained and sent in a first-in first-out (FIFO) order. The sideband information is retained in a buffer. The one or more thresholds includes a timing threshold. The one or more thresholds further includes a plurality of retained sideband information thresholds.

In another embodiment, a data storage device includes a memory device and a controller coupled to the memory device. The controller is configured to activate a timer when first sideband data is delivered to a buffer, accumulate additional sideband data in the buffer, deliver the accumulated sideband data to a host device upon reaching a timing threshold of a plurality of timing thresholds.

The timing threshold is dependent on a link state between the host device and the data storage device. An L0s state is associated with a first timing threshold. An L1 state is associated with a second timing threshold. The second timing threshold is greater than the first timing threshold. An L2 state is associated with a third timing threshold. The third timing threshold is greater than the second timing threshold. One or more L1 substates are associated with the third timing threshold. A difference in time between the first timing threshold, the second timing threshold, and the third timing threshold is equal. Each of the timing thresholds of the plurality of timing thresholds are equal. Each of the timing thresholds of the plurality of timing thresholds are adjusted dynamically.

In another embodiment, a data storage device includes memory means and a controller coupled to the memory means. The controller is configured to configure one or more thresholds, wherein each of the one or more thresholds corresponds with a link state of a plurality of link states, accumulate sideband information in a buffer, wake up a link between a host device and the data storage device, and send the accumulated sideband information to the host device.

Each link state has a corresponding threshold of a plurality of thresholds. A first threshold is less than a second threshold. The first threshold and the second threshold are in a MPS granularity. The first threshold is greater than a first MPS granularity. The first MPS granularity is equal to a MPS. The corresponding threshold is independent of a timing threshold. A first timing threshold for a first link state of the plurality of link states is independent of a second timing threshold for a second link state.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   create one or more thresholds for sending sideband information to a host device, wherein the one or more thresholds correspond to a link state between the host device and the data storage device, wherein the one or more thresholds are based on a time of retaining sideband information, wherein the controller utilizes a plurality of timers with each timinq different sideband information;
   determine that link state is in a state other than L0;
   retain the sideband information until the one or more thresholds is reached; and
   send the sideband information to the host device upon reaching the one or more thresholds for a corresponding link state.

2. The data storage device of claim 1, wherein an L0s state is associated with a first threshold, and wherein the first threshold is greater than a maximum payload size (MPS).

3. The data storage device of claim 2, wherein an L1 state is associated with a second threshold, and wherein the second threshold is greater than the first threshold.

4. The data storage device of claim 3, wherein an L2 state is associated with a third threshold, and wherein the third threshold is greater than the second threshold.

5. The data storage device of claim 4, wherein one or more L1 substates are associated with the third threshold.

6. The data storage device of claim 1, wherein the sideband information is retained and sent in a first-in first-out (FIFO) order.

7. The data storage device of claim 1, wherein the sideband information is retained in a buffer.

8. The data storage device of claim 1, wherein the one or more thresholds comprises a timing threshold.

9. The data storage device of claim 8, wherein the one or more thresholds further comprises a plurality of retained sideband information thresholds.

10. A data storage device, comprising:
    a memory device; and
    a controller coupled to the memory device, wherein the controller is configured to:
    create one or more thresholds for sending sideband information to a host device, wherein the one or more thresholds correspond to a link state between the host device and the data storage device, wherein the one or more thresholds are based on a time of retaininq sideband information:
    determine that link state is in a state other than L0:
    retain the sideband information until the one or more thresholds is reached; and
    send the sideband information to the host device upon reaching the one or more thresholds for a corresponding link state, wherein the controller is further configured to:
    activate a timer when first sideband data is delivered to a buffer;
    accumulate additional sideband data in the buffer; and
    deliver the accumulated sideband data to the host device upon reaching a timing threshold of the one or more thresholds.

11. The data storage device of claim 10, wherein the timing threshold is dependent on a link state between the host device and the data storage device, wherein an L0s state is associated with a first timing threshold, wherein an L1 state is associated with a second timing threshold, and wherein the second timing threshold is greater than the first timing threshold.

12. The data storage device of claim 11, wherein an L2 state is associated with a third timing threshold, and wherein the third timing threshold is greater than the second timing threshold.

13. The data storage device of claim 12, wherein one or more L1 substates are associated with the third timing threshold.

14. The data storage device of claim 13, wherein a difference in time between the first timing threshold, the second timing threshold, and the third timing threshold is equal.

15. The data storage device of claim 10, wherein the one or more threshold comprises a plurality of timing thresholds and each of the timing thresholds are equal.

16. The data storage device of claim 10, wherein the one or more threshold comprises a plurality of timing thresholds and each of the timing thresholds of the plurality of timing thresholds are adjusted dynamically.

17. A data storage device comprising:
    a memory device; and
    a controller coupled to the memory device, wherein the controller is configured to:
    create one or more thresholds for sending sideband information to a host device, wherein the one or more thresholds correspond to a link state between the host device and the data storage device, wherein the one or more thresholds are based on a time of retaining sideband information:
    determine that link state is in a state other than L0:
    retain the sideband information until the one or more thresholds is reached; and
    send the sideband information to the host device upon reaching the one or more thresholds for a corresponding link state, wherein the controller is further configured to:
    accumulate sideband information in a buffer;
    wake up a link between the host device and the data storage device; and
    send the accumulated sideband information to the host device.

18. The data storage device of claim 17, wherein each link state has a corresponding threshold of a plurality of thresholds, and wherein a first threshold is less than a second threshold.

19. The data storage device of claim 18, wherein the first threshold and the second threshold are in a MPS granularity, wherein the first threshold is greater than a first MPS granularity, and wherein the first MPS granularity is equal to a MPS.

20. The data storage device of claim 18, wherein the corresponding threshold is independent of a timing threshold, and wherein a first timing threshold for a first link state is independent of a second timing threshold for a second link state.

\* \* \* \* \*